April 4, 1944.   R. E. MOTHERSHEAD   2,345,621
WITHE FOR MASTS, FLAGPOLES, AND THE LIKE
Filed Sept. 12, 1942
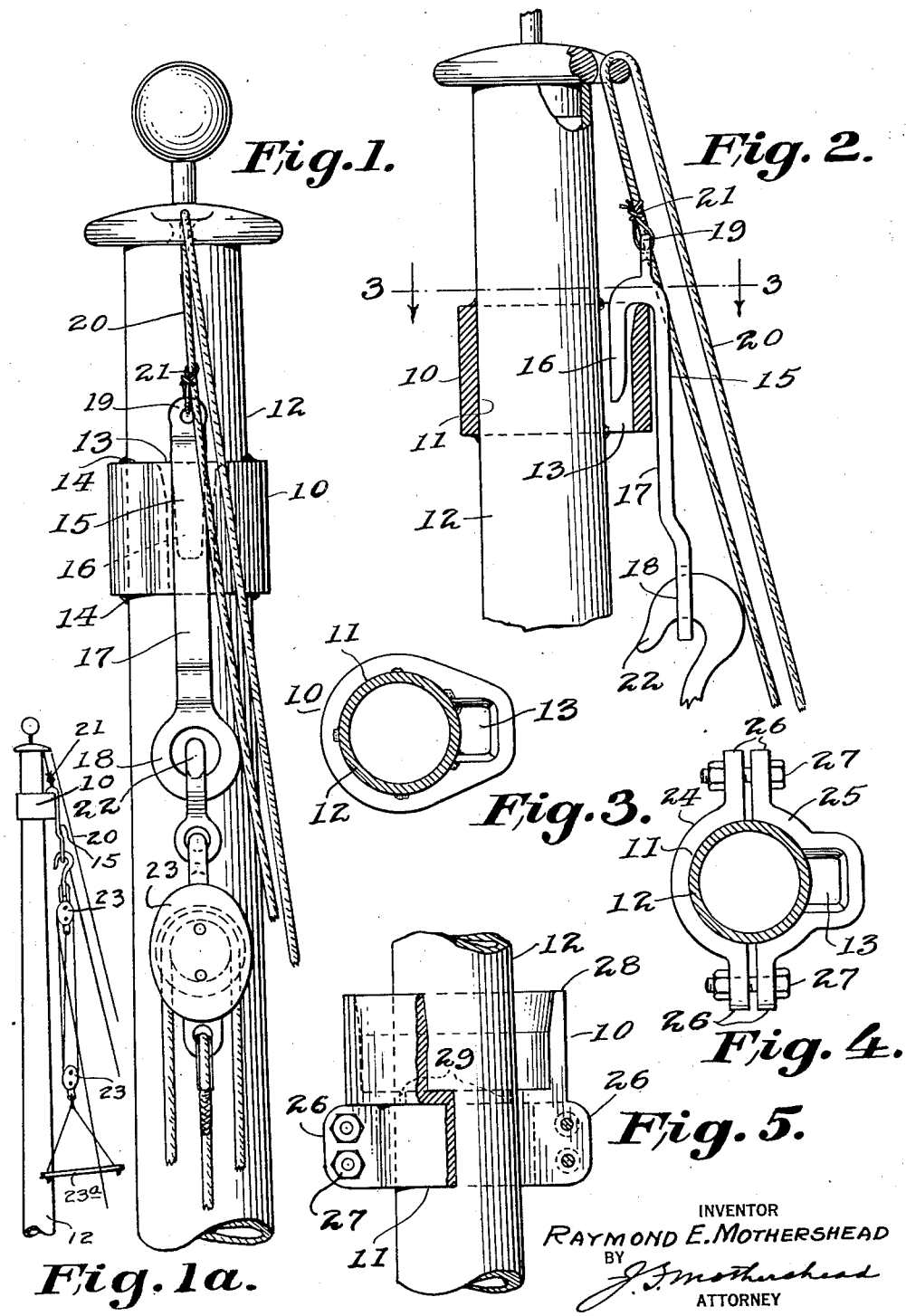
INVENTOR
RAYMOND E. MOTHERSHEAD
BY
ATTORNEY Patented Apr. 4, 1944

2,345,621

UNITED STATES PATENT OFFICE 2,345,621

WITHE FOR MASTS, FLAG POLES, AND THE LIKE

Raymond E. Mothershead, Seat Pleasant, Md., assignor to Government of the United States, as represented for the purpose hereof by the Secretary of Commerce Application September 12, 1942, Serial No. 458,177

1 Claim. (Cl. 254—188)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to withes or boom irons to be applied to masts, flagpoles and the like in combination with a cooperative hook for releasably engaging the improved withes or boom irons.

The invention contemplates the use of a supporting collar or boom iron, herein referred to as a withe, to which suspension hooks of blocks and tackles may be elevated and brought into engagement with the withe by halyards of conventional types, operable through loops or pulleys at or near the tops of masts and flagpoles.

A purpose of the invention is to provide means whereby the seats or horses of painters and repairmen may be readily suspended and released from desired points on masts and flagpoles beneath halyard pulleys without first requiring a scaling of the mast or pole or employing ladders and scaffolds for securing blocks and tackles.

These and other objects of the invention will become apparent from the following description and appended claim. Certain embodiments having the characteristics of the invention and by which the same may be practiced are illustrated in the accompanying drawing in which:

Fig. 1 is an elevational view of the upper end portion of a flagpole to which an embodiment of my improvement is applied in operative position;

Fig. 1A, a diagrammatic showing, illustrating in operative assembly a purpose of the improvements, namely, to adjustably secure a horse to a mast;

Fig. 2, a side elevation of the Fig. 1 embodiment, illustrating the withe in vertical section;

Fig. 3, a plan view of the Fig. 1 embodiment of the withe taken cross sectionally of the pole as at line 3—3 of Fig. 2;

Fig. 4, a view similar to that of Fig. 3 but illustrative of a modified form of withe; and Fig. 5, a sectionalized elevational view of another modified form of withe.

In the embodiment illustrated in Figs. 1, 2 and 3 the withe 10 comprises a solid band or sleevelike member, the opening 11 of which is preferably of a size and configuration comparable with that of the exterior of the pole 12 onto which the withe is to be positioned. One or more of the inner walls of the withe is provided with a groovelike passageway or recess 13 extending in the general direction of the opening 11 but laterally and beyond the area thereof to accommodate the nose of a hook without interference by a pole extending through the withe opening 11. In other words, the opening 11 and laterally extending passageway or recess 13 may be considered as of a shape commonly referred to as a keyhole.

The passageway portion or recess 13 of the opening through the withe may also be considered as comparable to a keyway for the receipt of the nose of a hook.

The cross sectional area of the opening 11 through the Fig. 1 embodiment of withe 10 is preferably such as will cause the withe to fit or seat itself upon the surface of a slightly tapered pole when passed thereover, and the cross sectional area of that opening may be constant throughout or tapered to a degree comparable with that of the usual taper of masts and flagpoles. The withe 10 may be welded, as shown at reference 14, at top and bottom to metallic poles if desired, to secure its position.

The passageway or recess 13 of the withe may be provided with a tapered mouth which will aid in guiding a hook into proper engagement with the withe as it is lowered thereover.

The cooperative hooklike member 15 forming a part of my combination of improvements has the usual U-shaped portion, one leg of which terminates in a hook nose 16 and the other extends into a shank 17 provided with a loop 18. The hook nose 16 is preferably, though not necessarily, of a cross sectional shape comparable with that of the recess 13 to maintain the hook firmly in engaging position. The hook 15 is also provided with a loop 19 extending outwardly beyond the crest of the U-shaped portion for securing the hook to a halyard 20 which may be done by simply tying the one to the other as indicated at reference character 21.

In operation the improved hook 15 is secured to a halyard 20, the hook 22 of the block and tackle 23 hooked into the shank loop 18 and the block and tackle, suspended from the improved hook 15, elevated by the halyard to a position where the nose 16 of the improved hook is above the passageway 13 whereupon the halyard is released and the nose 16 of the improved hook lowered into the passageway 13.

The withe should be mounted a sufficient distance beneath the halyard pulley to allow the hook to be elevated sufficiently above the withe by the halyard to thereby permit the hook nose 16 to be lowered into the recess 13 of the withe after having been elevated above the withe by the halyard.

A block and tackle for elevating, suspending, and lowering a painter's seat or horse 23A thus may be easily secured in a readily releasable manner to the upper portion of the pole by a ground operation.

The withe illustrated in Fig. 4, rather than being formed as a solid band or sleeve, is formed in two portions 24 and 25 and provided with laterally projecting ears 26 with holes therethrough to accommodate bolts 27 whereby the two portions may be secured together and clamped tightly about a pole or mast at desired positions.

In the embodiment shown in Fig. 5, the withe 10 which is there illustrated as being in two sections clamped together around the mast 12, has formed integral with each withe section a vertical upstanding semi-annular wall 28, the inner surface of which is offset outwardly from the inner or mast engaging surface of the withe. When the two withe sections are clamped together in operative position around the mast 12, the two outwardly offset walls 28 provide a vertical annular upstanding wall surrounding the mast but spaced apart therefrom to form a continuous annular recess or chamber between the mast 12 and the vertical annular upstanding wall 28.

In extensive practice in the use of this invention, it has been found that the novel construction of the withe embodying this upstanding offset annular wall 28 which forms a continuous annular recess or chamber between the mast and the annular upstanding wall, provides the most advantageous arrangement, for the following reasons.

In the construction of the withe shown, for instance, in Figs. 1 and 3, the hook-receiving recess 13 of the withe, must be precisely lined up directly under the mast halyard pulley at the masthead, otherwise the mast halyard 20 will not guide the hook 15 into registering engagement with said hook-receiving recess, which when operating the device under windy conditions, tends to position the hook to one side or the other of the hook-receiving recess 13, rendering it difficult to effect the necessary connection between the hook 15 and the hook-receiving recess 13 of the withe.

In the employment of the improved construction of withe of the type shown in Fig. 5, wherein the provision of the offset hook-receiving annular wall 28 provides a continuous hook-receiving member entirely surrounding the mast no lining up of the withe with the mast halyard is required, nor is the facility with which the connection of the hook 15 is established with the withe impaired by the effect of wind acting on the mast halyard 20.

When the mast 12 is tapered and the withe is affixed thereto while on the ground and before it is erected into operating position the solid withe of proper internal diameter in one integral piece is preferable, but in instances where the withe is to be affixed to existing masts already in erected position, the use of the split withe is advisable, while in all cases where the mast is not tapered the split withe clamped around the mast is necessary.

Having described my invention and illustrated embodiments by which the same may be practiced, what I claim is:

In a device of the class described, the combination with a mast and mast halyard, of a withe fixed on the mast adjacent the mast-head, a hook for supporting a block and tackle and adapted for connection with the mast halyard in such manner that the hook supporting the block and tackle may be raised by the mast halyard for engagement with the withe, said withe including an integral vertical upstanding annular wall offset outwardly from the inner mast-engaging surface of the withe and spaced apart from the mast whereby a continuous annular recess is formed between the mast and the integral vertical upstanding annular wall, so that operative connection may be effected between the block and tackle supporting hook and the integral vertical upstanding annular wall at any point around the mast, the continuous recess formed by said wall around the mast receiving the end of the said hook.

RAYMOND E. MOTHERSHEAD.